(12) United States Patent
Prissok et al.

(10) Patent No.: US 12,173,152 B2
(45) Date of Patent: Dec. 24, 2024

(54) ISOCYANATE-POLYAMIDE BLOCK COPOLYMERS

(71) Applicant: BASF SE, Ludwigshafen am Rhein (DE)

(72) Inventors: Frank Prissok, Lemfoerde (DE); Florian Puch, Ludwigshafen (DE); Elmar Poeselt, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 753 days.

(21) Appl. No.: 17/286,827

(22) PCT Filed: Oct. 22, 2019

(86) PCT No.: PCT/EP2019/078708
§ 371 (c)(1),
(2) Date: Apr. 20, 2021

(87) PCT Pub. No.: WO2020/083900
PCT Pub. Date: Apr. 30, 2020

(65) Prior Publication Data
US 2021/0380805 A1     Dec. 9, 2021

(30) Foreign Application Priority Data

Oct. 23, 2018 (EP) .................. 18202049

(51) Int. Cl.
| | | |
|---|---|---|
| *C08L 77/00* | (2006.01) | |
| *C08G 18/20* | (2006.01) | |
| *C08G 18/34* | (2006.01) | |
| *C08G 18/48* | (2006.01) | |
| *C08G 18/76* | (2006.01) | |

(52) U.S. Cl.
CPC .......... *C08L 77/00* (2013.01); *C08G 18/2027* (2013.01); *C08G 18/341* (2013.01); *C08G 18/4854* (2013.01); *C08G 18/7657* (2013.01); C08G 2410/00 (2013.01); C08L 2203/14 (2013.01); C08L 2203/16 (2013.01); C08L 2203/202 (2013.01); C08L 2203/30 (2013.01)

(58) Field of Classification Search
CPC .............. C08G 18/2027; C08G 18/341; C08G 18/4854; C08G 18/7657; C08G 2410/00; C08L 77/00
See application file for complete search history.

(56) References Cited

U.S. PATENT DOCUMENTS

| | | |
|---|---|---|
| 4,420,602 A | 12/1983 | Bonk et al. |
| 2013/0225708 A1 | 8/2013 | Prissok et al. |
| 2016/0376483 A1 | 12/2016 | Eustache et al. |

FOREIGN PATENT DOCUMENTS

| | | |
|---|---|---|
| DE | 195 34 644 | 3/1997 |
| DE | 10 2004 034 039 | 4/2008 |
| EP | 0 361 313 | 4/1990 |
| EP | 0104391 | 11/1991 |
| EP | 1 546 234 | 1/2009 |
| EP | 2 700 669 | 2/2014 |
| JP | 62-209123 | 9/1987 |
| JP | 62-292819 | 12/1987 |
| JP | H11-268098 | 10/1999 |
| JP | 2015-513361 | 5/2015 |
| JP | 2015-529721 | 10/2015 |
| WO | WO2013127814 A2 * | 9/2013 |

OTHER PUBLICATIONS

Diller et al., "*Rohstoffe*", Kunststoffhandbuch, Band 7, Polyurethane, 1993, pp. 57-75.
International Preliminary Report on Patentability mailed on Apr. 29, 2021 in PCT/EP2019/078708, 19 Pages with English translation.
Schuemacher et al., "*Condensation Between Isocyanates and Carboxylic Acids in the Presence of 4-Dimethylaminopyridine (DMAP), a Mild and Efficient Synthesis of Amides*", Synthesis 2001, No. 2, pp. 243-246.

* cited by examiner

*Primary Examiner* — John M Cooney
*Assistant Examiner* — Jeffrey S Lenihan
(74) *Attorney, Agent, or Firm* — Grüneberg and Myers PLLC

(57) ABSTRACT

A thermoplastic polyamide can be obtained through the reaction of at least the components (i), (ii), and (iii), where a catalyst having a Lewis base component is used in the reaction. Component (i) is a composition containing a polymeric compound having two carboxylic acid moieties; component (ii) is a dicarboxylic acid composition containing at least one dicarboxylic acid; and component (iii) is a diisocyanate composition containing at least one diisocyanate. A process can be used for producing the thermoplastic polyamide and a method for the use thereof. A tandem reactive extruder can be used for the reaction.

15 Claims, 1 Drawing Sheet

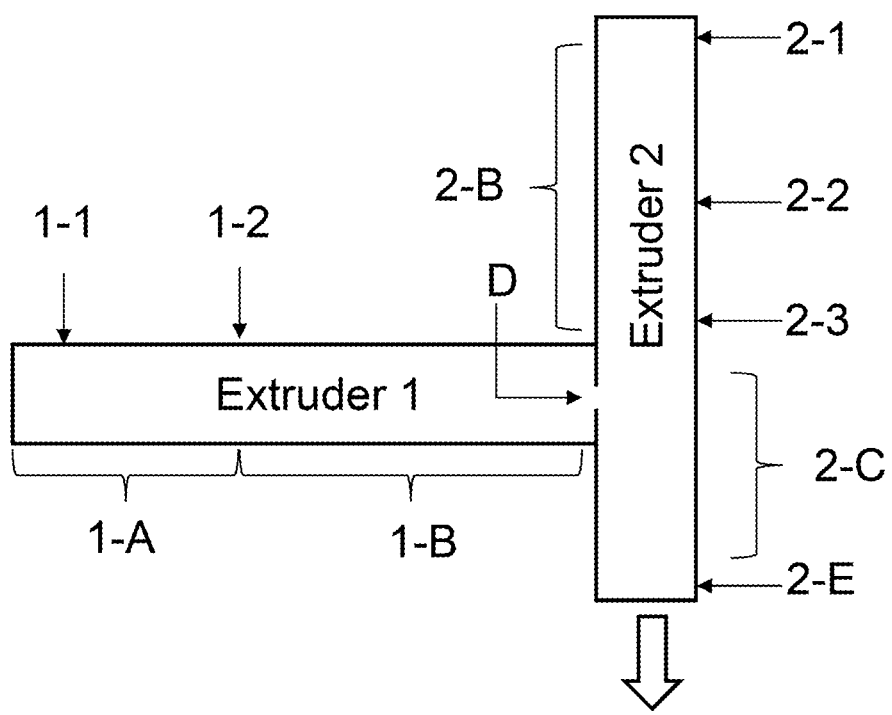

ISOCYANATE-POLYAMIDE BLOCK COPOLYMERS

CROSS-REFERENCE TO RELATED APPLICATIONS

This application is the National Stage entry under § 371 of International Application No. PCT/EP2019/078708, filed on Oct. 22, 2019, and which claims the benefit of European Application No. 18202049.5, filed on Oct. 23, 2018. The content of each of these applications is hereby incorporated by reference in its entirety.

BACKGROUND OF THE INVENTION

Field of the Invention

The present invention relates to a thermoplastic polyamide obtainable or obtained through the reaction of at least the components (i), (ii), and (iii): a composition comprising a polymeric compound having two carboxylic acid moieties (i); a dicarboxylic acid composition comprising at least one dicarboxylic acid (ii); a diisocyanate composition comprising at least one diisocyanate (iii). The invention additionally relates to a process for producing the thermoplastic polyamide and the use thereof and to a tandem reactive extruder.

Description of Related Art

Thermoplastic block copolymers such as thermoplastic polyurethane (TPU), thermoplastic polyether esters, and polyester esters (TPEEs) have been known for a long time. They form on a hard phase derived from an often aromatic, difunctional building block such as a diisocyanate or a dicarboxylic acid, a short-chain diol, and a soft, elastic phase derived from a long-chain difunctional polyol. Polyamide block copolymers (TPAs), such as polyether amide (for example Pebax), consist of an aliphatic polyamide building block and a polyetherol unit, which are in most cases introduced into the polymer through terminal amine groups. Polyether amides rank among the highest-cost thermoplastic elastomers and have advantages over TPUs in their thermal stability and "snapback" (spontaneous elasticity with high dynamic recovery), but are significantly more expensive and are complicated to use in production. There is consequently the need for a product that combines the properties of TPUs (continuous production, high elasticity and tensile strength) and TPAs (good thermal stability and resistance to solvents, snapback), allows a less complicated synthesis, and is cost-effective to use in production.

A mixed form from polyurethane (PU) and polyamide (PA) is described in EP 2 700 669 A1, which relates to a plastically deformable rigid polyurethane-polyamide foam with a closed-cell factor of less than 70%, and a process for its production in which organic polyisocyanate is reacted with one or more polymeric compounds having at least two hydrogen atoms reactive towards isocyanates and one or more carboxylic acids having a functionality of at least 2, with the use of a catalyst, to form a rigid polyurethane-polyamide foam. The carboxylic acids used are, in particular, aliphatic dicarboxylic acids having 2 to 30 carbon atoms; the polymeric compounds having at least two hydrogen atoms reactive towards isocyanates are polyether polyols with a polypropylene oxide content of not less than 50% by weight based on the alkylene oxide content in the polyalkylene oxide polyol. However, they do not have the degree of cross-linking of thermoplastically processable products, which likewise are not block copolymers.

In addition, pure mixtures of TPU and PA, such as PA6, PA6.6 or PA12, are known. These are blends produced from granule mixtures, normally in an extruder or kneader. Depending on the amounts in which the raw materials are used, ones in which TPU predominates tend towards TPU properties and ones in which PA predominates towards polyamide properties. However, the absence of a chemical bond between the components means their use is compromised by this shortcoming, consequently the product properties are little better than those of pure TPU or PA.

SUMMARY OF THE INVENTION

The object of the present invention was thus to provide a production process and a polymer with which the above disadvantages can be avoided and which combine the properties of TPUs and TPAs.

The object was achieved with a thermoplastic polyamide obtainable or obtained through the reaction of at least the components (i), (ii), and (iii):
  (i) a composition comprising a polymeric compound having two carboxylic acid moieties;
  (ii) a dicarboxylic acid composition comprising at least one dicarboxylic acid;
  (iii) a diisocyanate composition comprising at least one diisocyanate.

BRIEF DESCRIPTION OF THE DRAWING

The FIGURE shows a reactive extruder with a tandem assembly of two extruders.

DETAILED DESCRIPTION OF THE INVENTION

Surprisingly, it was found that, in accordance with the synthetic principle of TPUs—reaction of a diisocyanate with a diol and a polyol to form a block copolymer—the components diisocyanate, short-chain carboxylic acid, and polymeric compound having two carboxylic acid groups result in the production of a polymer that has a structure identical to that of TPU, but with amide instead of urethane linkages. The carbon dioxide formed can either be removed from the polymer in a vent zone or it can be used directly as a blowing agent for foaming. Production was successfully achieved on a continuously operated extruder, in particular on a tandem reactive extruder, this being a cost-effective method of production.

In an embodiment of the thermoplastic polyamide, the composition in accordance with (i) comprises 95% by weight, preferably 99% by weight, of one or more polymeric compounds each having two carboxylic acid moieties, based on the total weight of the composition in accordance with (i).

In an embodiment of the thermoplastic polyamide, the dicarboxylic acid composition in accordance with (ii) comprises 95% by weight, preferably 99% by weight, of one or more dicarboxylic acids and/or dicarboxylic anhydrides, based on the total weight of the dicarboxylic acid composition in accordance with (ii).

In an embodiment of the thermoplastic polyamide, the diisocyanate composition in accordance with (iii) comprises 95% by weight, preferably 99% by weight, of one or more diisocyanates, based on the total weight of the diisocyanate composition in accordance with (iii).

Polymeric Compound Having Two Carboxylic Acid Moieties in Accordance with (i)

In an embodiment of the thermoplastic polyamide, the composition comprising a polymeric compound having two carboxylic acid moieties in accordance with (i) is obtained or obtainable through the reaction of the components (ia) and (ib):
- (ia) a diol composition comprising a dihydric polyester diol or polyether diol; and
- (ib) a dicarboxylic acid composition;
- to obtain a polymeric compound having two carboxylic acid moieties.

The polymeric compound having two carboxylic acid moieties preferably has no free hydroxyl groups other than the OH groups present in the COOH groups.

In accordance with (ia), a diol composition comprising a dihydric polyester diol or polyether diol is used. Suitable dihydric polyester diols are known per se to those skilled in the art. Polyester diols may be prepared, for example, from organic dicarboxylic acids having 2 to 12 carbon atoms, preferably aliphatic dicarboxylic acids having 4 to 6 carbon atoms, and diols having 2 to 12 carbon atoms, preferably 2 to 6 carbon atoms. Examples of dicarboxylic acids that may be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used either individually or in admixture with one another. Instead of the free dicarboxylic acids it is also possible to use the corresponding dicarboxylic acid derivatives, for example dicarboxylate esters of alcohols having 1 to 4 carbon atoms or dicarboxylic anhydrides. Preference is given to using dicarboxylic acid mixtures of succinic acid, glutaric acid, and adipic acid in quantity ratios of, for example, 20 to 35:35 to 50:20 to 32 parts by weight, and in particular adipic acid. Examples of dihydric alcohols are: ethanediol, diethylene glycol, 1,2- and 1,3-propanediol, dipropylene glycol, 1,4-butanediol, 1,5-pentanediol, 1,6-hexanediol, and 1,10-decanediol. Preference is given to using ethanediol, diethylene glycol, 1,4-butanediol, 1,5-pentanediol, and 1,6-hexanediol. It is also possible to use polyester diols derived from lac-tones, for example ε-caprolactone, or hydroxycarboxylic acids, for example ω-hydroxycaproic acid.

The polyester diols may be prepared by polycondensation of the organic, for example aromatic and preferably aliphatic dicarboxylic acids and/or derivatives and dihydric alcohols without catalyst or preferably in the presence of esterification catalysts, ideally in an atmosphere of inert gas, for example nitrogen, carbon monoxide, helium, argon, etc., in a melt at temperatures of 150 to 250° C., preferably 180 to 220° C., optionally under reduced pressure, down to the desired acid number which is preferably less than 10, more preferably less than 2. In a preferred embodiment, the esterification mixture undergoes polycondensation at the above-mentioned temperatures down to an acid number of 80 to 30, preferably 40 to 30, under standard pressure and subsequently under a pressure of less than 500 mbar, preferably 50 to 150 mbar. Examples of esterification catalysts that may be used are iron catalysts, cadmium catalysts, cobalt catalysts, lead catalysts, zinc catalysts, antimony catalysts, magnesium catalysts, titanium catalysts, and tin catalysts in the form of metals, metal oxides or metal salts. However, the polycondensation may also be carried out in the liquid phase in the presence of diluents and/or entraining agents, for example benzene, toluene, xylene or chlorobenzene, for removal of the water of condensation by azeotropic distillation. For the production of the polyester diols, the organic dicarboxylic acids and/or derivatives and dihydric alcohols advantageously undergo polycondensation in a molar ratio of 1:1 to 1.8, preferably 1:1.05 to 1.2.

The polyester diols used have a functionality of 2 and, for example, a number-average molecular weight of 480 to 3000 g/mol, preferably 1000 to 3000 g/mol.

Suitable dihydric polyether polyols are known per se to those skilled in the art. Polyetherols are prepared by known processes, for example by anionic polymerization with alkali metal hydroxides or alkali metal alkoxides as catalysts and with addition of at least one starter molecule comprising 2 to 8 reactive hydrogen atoms in bonded form, or through cationic polymerization with Lewis acids such as antimony pentachloride or boron fluoride etherate or through bases, for example potassium hydroxide, from one or more alkylene oxides having 2 to 4 carbon atoms in the alkylene radical. Suitable alkylene oxides are, for example, 1,3- and 1,2-propylene oxide, 1,2- and 2,3-butylene oxide, and ethylene oxide. In addition, tetrahydrofuran monomer may be used.

In an embodiment, the dihydric polyester diol or polyether diol, which comprises the diol composition in accordance with (ia), is selected from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 1500 g/mol.

In accordance with (ib), a dicarboxylic acid composition is used. The dicarboxylic acid composition comprises one or more dicarboxylic acids and/or one or more dicarboxylic acid derivatives.

As the dicarboxylic acid, preference is given to organic dicarboxylic acids having 2 to 12 carbon atoms, further preferably aliphatic dicarboxylic acids having 4 to 6 carbon atoms. Examples of dicarboxylic acids that may be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used either individually or in admixture with one another. Instead of, or in addition to, the free dicarboxylic acids it is also possible to use the corresponding dicarboxylic acid derivatives, for example dicarboxylic anhydrides, which may likewise be used individually or in admixture with one another, and also mixtures comprising free dicarboxylic acids and dicarboxylic acid derivatives.

In an embodiment of the thermoplastic polyamide, the dicarboxylic acid composition in accordance with (ib) comprises at least one dicarboxylic acid or one dicarboxylic anhydride, with the dicarboxylic acid or dicarboxylic anhydride preferably selected from the group consisting of C2 to C12 dicarboxylic acids and the anhydrides thereof, further preferably from the group consisting of C4 to C8 dicarboxylic acids and the anhydrides thereof, further preferably at least 1,4-butanedioic acid (succinic acid) and succinic anhydride.

In an embodiment of the thermoplastic polyamide, the composition comprising a polymeric compound having two carboxylic acid moieties in accordance with (i) comprises at least one polyester dicarboxylic acid, polycarbonate dicarboxylic acid or polyether dicarboxylic acid, with the polyester, polycarbonate or polyether component preferably selected from the group of dihydric polyesters, polycarbonates, and polyethers, preferably from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 2000 g/mol. The polymeric compound having two carboxylic acid moieties comprises preferably at least HOOC—(CH$_2$)$_x$COO-PTHF—OOC—(CH$_2$)$_y$—COOH, where x and y are each independently an integer in the range from 1 to 10, preferably in the range from 1 to 5, further preferably in the range 1 to 3, with the polymeric compound having two carboxylic acid moieties further preferably comprising at least HOOC—(CH$_2$)$_2$—COO-PTHF—OOC—(CH$_2$)$_2$—COOH.

Dicarboxylic Acid Composition in Accordance with (ii)

In accordance with (ii), a dicarboxylic acid composition is likewise used, with the dicarboxylic acid composition comprising one or more dicarboxylic acids. As the dicarboxylic acid, preference is given to organic dicarboxylic acids having 2 to 12 carbon atoms, further preferably aliphatic dicarboxylic acids having 4 to 6 carbon atoms. Examples of dicarboxylic acids that may be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used either individually or in admixture with one another.

In an embodiment of the thermoplastic polyamide, the dicarboxylic acid composition in accordance with (ii) comprises at least one dicarboxylic acid, preferably selected from the group of C2 to C12 dicarboxylic acids, further preferably from the group of C4 to C8 dicarboxylic acids, further preferably at least 1,6-hexanedioic acid (adipic acid).

Diisocyanate Composition in Accordance with (iii)

In accordance with (iii), a diisocyanate composition is used. The diisocyanate composition here comprises at least one diisocyanate. According to the invention, the diisocyanate composition may also comprise two or more diisocyanates.

Diisocyanates that may be used are aliphatic, cycloaliphatic, araliphatic, and/or aromatic diisocyanates. Specific examples include the following aromatic isocyanates: 2,4-tolylene diisocyanate, mixtures of 2,4- and 2,6-tolylene diisocyanate (TDI), 4,4'-, 2,4'-, and/or 2,2'-diphenylmethane diisocyanate (MDI), mixtures of 2,4'- and 4,4'-diphenylmethane diisocyanate, urethane-, carbodiimide- or uretonimine-modified liquid 4,4'- and/or 2,4-diphenylmethane diisocyanate, 4,4'-diisocyanatodiphenylethane, mixtures of monomeric methylene diphenyl diisocyanates, and higher polycyclic homologs of methylene diphenyl diisocyanates (polymeric MDI), (1,2) and 1,5-naphthylene diisocyanate.

Aliphatic diisocyanates used are customary aliphatic and/or cycloaliphatic diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or 1-methyl-2,6-cyclohexane diisocyanate, 4,4'-, 2,4'- and/or 2,2'-dicyclohexylmethane diisocyanate.

In an embodiment of the thermoplastic polyamide, the diisocyanate composition in accordance with (iii) comprises at least one diisocyanate selected from the group consisting of 2,2'-diphenylmethane diisocyanate (2,2'-MDI), 2,4'-diphenylmethane diisocyanate (2,4'-MDI), 4,4'-diphenylmethane diisocyanate (4,4'-MDI), hexamethylene 1,6-diisocyanate (HDI), and 4,4'-, 2,4'-, and 2,2'-methylenedicyclohexyl diisocyanate (H12MDI), naphthylene diisocyanate NDI, tolylene diisocyanate (TDI), tolidine diisocyanate (TODI), para-diphenyl diisocyanate (PDI), preferably at least MDI.

In a preferred embodiment, aromatic diisocyanates are used. The use of an aromatic diisocyanate yields partially aromatic amide block copolymers with further-improved thermal stability.

The diisocyanate composition in accordance with (iii) may also be used in the form of a prepolymer, preferably a prepolymer having two free isocyanate groups, derived from at least one diisocyanate and at least one polyol, preferably a polyol having two terminal hydroxyl groups.

The use of a prepolymer allows the additional incorporation of urethane groups into the block copolymer in controllable proportions, through which it is possible, for example, to modify the properties of the polymer or increase its molecular weight.

Diisocyanate prepolymers are obtainable by reacting an excess of the above-described diisocyanates, for example at temperatures from 30 to 150° C., preferably at temperatures from 50 to 120° C., most preferably at approximately 80° C., with polyols to form the prepolymer. The preparation of the prepolymers according to the invention is preferably carried out using diisocyanates and commercially available polyols based on polyesters, derived for example from adipic acid, or polyethers, derived for example from ethylene oxide and/or propylene oxide, with the polyols preferably having two terminal OH groups.

Polyols are familiar to those skilled in the art and described for example in "Kunststoffhandbuch" [Plastics Handbook], volume 7, "Polyurethane" [Polyurethanes], Carl Hanser Verlag, 3rd edition, 1993, chapter 3.1. Particular preference is given to polyetherols as the polyols used.

Customary chain extenders or crosslinkers are optionally added to the named polyols during production of the isocyanate prepolymers. Such substances are known in principle from the prior art. The ratio of organic diisocyanates to polyols and optional chain extenders is preferably chosen such that the isocyanate prepolymer has an NCO content of 2% to 33.5%, preferably 10% to 32%, further preferably of 12% to 30%, and most preferably an NCO content of 15% to 28%.

In an embodiment, the diisocyanate composition in accordance with (iii) does not comprise a 30 prepolymer, with preference given, in the production of the thermoplastic polyamide, to the use of no prepolymers in the reaction of (i), (ii), and (iii).

The production of the thermoplastic polyamide preferably uses no compound having free hydroxyl groups in the reaction of (i), (ii), and (iii); further preferably none of components (i), (ii), and (iii) contains free hydroxyl groups, further preferably none of components (i), (ii), and (iii) contains free hydroxyl groups and no further components having free hydroxyl groups are used.

In a preferred embodiment, the thermoplastic polyamide is obtainable or obtained through the reaction of at least the components (i), (ii), and (iii):

(i) a diisocyanate composition comprising at least MDI;

(ii) a polyester dicarboxylic acid or polyether dicarboxylic acid composition comprising at least HOOC—(CH$_2$)$_x$COO-PTHF—OOC—(CH$_2$)$_y$—COOH, where x and y are independently an integer in the range from 1 to 10, preferably in the range from 1 to 5, further preferably in the range 1 to 3, further preferably at least HOOC—(CH$_2$)$_2$—COO-PTHF—OOC—(CH$_2$)$_2$—COOH;

(iii) a dicarboxylic acid composition comprising at least adipic acid.

The PTHF preferably has a number-average molecular weight Mn in the range from 500 to 3000 g/mol, further preferably in the range from 500 to 2000 g/mol.

The components (i), (ii), and (iii) are preferably used in a molar ratio of [(i)+(ii)]:(iii) in the range from 10:1 to 1:10, preferably in the range from 5:1 to 1:5, further preferably in the range from 2:1 to 1:2, further preferably in the range from 1.5:1 to 1:1.5, further preferably in the range from 1.2:1 to 1:1.2, further preferably in the range from 1.1:1 to 1:1.1, further preferably in the molar ratio [(i)+(ii)]:(iii) of 1:1. The molar ratio (i):(ii) is preferably in the range from 10:1 to 1:10, preferably in the range from 5:1 to 1:5, further preferably in the range from 2:1 to 1:2, further preferably in the range from 1.5:1 to 1:1.5, further preferably in the range from 1.2:1 to 1:1.2, further preferably in the range from 1.1:1 to 1:1.1, further preferably 1:1.

Preference is given to the use in the reaction of a catalyst having a Lewis base component, preferably a catalyst selected from the group consisting of N-methylimidazole, melamine, guanidine, cyanuric acid, dicyandiamide, and mixtures thereof, further preferably at least N-methylimidazole.

In a subsequent step the product may be extended or crosslinked with a polyisocyanate or polyepoxide, with use of a difunctional crosslinker preferred. If, for example, recycling can be avoided, use of a higher-functional crosslinker is also possible. In the case of polymers having terminal NCO groups, preference is given to using epoxides such as bisphenol A derivatives or aliphatic diepoxides and, in the case of terminal acid groups, to diisocyanates such as MDI.

Process for Producing a Thermoplastic Polyamide

The invention likewise relates to a process for producing a thermoplastic polyamide, in particular a thermoplastic polyamide, comprising the reaction of at least the following components:
- (i) a composition comprising a polymeric compound having two carboxylic acid moieties;
- (ii) a dicarboxylic acid composition;
- (iii) a diisocyanate composition.

In an embodiment of the production process for the thermoplastic polyamide, the composition in accordance with (i) comprises 95% by weight, preferably 99% by weight, of one or more polymeric compounds each having two carboxylic acid moieties, based on the total weight of the composition in accordance with (i).

In an embodiment of the production process for the thermoplastic polyamide, the dicarboxylic acid composition in accordance with (ii) comprises 95% by weight, preferably 99% by weight, of one or more dicarboxylic acids and/or dicarboxylic anhydrides, based on the total weight of the dicarboxylic acid composition in accordance with (ii).

In an embodiment of the production process for the thermoplastic polyamide, the diisocyanate composition in accordance with (iii) comprises 95% by weight, preferably 99% by weight, of one or more diisocyanates, based on the total weight of the diisocyanate composition in accordance with (iii).

In an embodiment of the production process for the thermoplastic polyamide, the composition comprising a polymeric compound having two carboxylic acid moieties in accordance with (i) is obtained or obtainable through the reaction of the components (ia) and (ib):
- (ia) a diol composition comprising a dihydric polyester diol or polyether diol; and
- (ib) a dicarboxylic acid composition;
to obtain a polymeric compound having two carboxylic acid moieties.

The polymeric compound having two carboxylic acid moieties preferably has no free hydroxyl groups other than the OH groups present in the COOH groups.

In accordance with (ia), a diol composition comprising a dihydric polyester diol or polyether diol is used. Suitable dihydric polyester diols are known per se to those skilled in the art. Polyester diols may be prepared, for example, from organic dicarboxylic acids having 2 to 12 carbon atoms, preferably aliphatic dicarboxylic acids having 4 to 6 carbon atoms, and diols having 2 to 12 carbon atoms, preferably 2 to 6 carbon atoms. Examples of dicarboxylic acids that may be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid.

The dicarboxylic acids may be used either individually or in admixture with one another. Instead of the free dicarboxylic acids it is also possible to use the corresponding dicarboxylic acid derivatives, for example dicarboxylate esters of alcohols having 1 to 4 carbon atoms or dicarboxylic anhydrides. Preference is given to using dicarboxylic acid mixtures of succinic acid, glutaric acid, and adipic acid in quantity ratios of, for example, 20 to 35:35 to 50:20 to 32 parts by weight, and in particular adipic acid. Examples of dihydric alcohols are: ethanediol, diethylene glycol, 1,2- and 1,3-propanediol, dipropylene glycol, 1,4-butanediol, 1,5-pentanediol, 1,6-hexanediol, and 1,10-decanediol. Preference is given to using ethanediol, diethylene glycol, 1,4-butanediol, 1,5-pentanediol, and 1,6-hexanediol. It is also possible to use polyester diols derived from lac-tones, for example ε-caprolactone, or hydroxycarboxylic acids, for example ω-hydroxycaproic acid.

The polyester diols may be prepared by polycondensation of the organic, for example aromatic and preferably aliphatic dicarboxylic acids and/or derivatives and dihydrc alcohols without catalyst or preferably in the presence of esterification catalysts, ideally in an atmosphere of inert gas, for example nitrogen, carbon monoxide, helium, argon, etc., in a melt at temperatures of 150 to 250° C., preferably 180 to 220° C., optionally under reduced pressure, down to the desired acid number which is preferably less than 10, more preferably less than 2. In a preferred embodiment, the esterification mixture undergoes polycondensation at the above-mentioned temperatures down to an acid number of 80 to 30, preferably 40 to 30, under standard pressure and subsequently under a pressure of less than 500 mbar, preferably 50 to 150 mbar. Examples of esterification catalysts that may be used are iron catalysts, cadmium catalysts, cobalt catalysts, lead catalysts, zinc catalysts, antimony catalysts, magnesium catalysts, titanium catalysts, and tin catalysts in the form of metals, metal oxides or metal salts. However, the polycondensation may also be carried out in the liquid phase in the presence of diluents and/or entraining agents, for example benzene, toluene, xylene or chlorobenzene, for removal of the water of condensation by azeotropic distillation. For the production of the polyester diols, the organic dicarboxylic acids and/or derivatives and dihydric alcohols advantageously undergo polycondensation in a molar ratio of 1:1 to 1.8, preferably 1:1.05 to 1.2.

The polyester diols used have a functionality of 2 and, for example, a number-average molecular weight of 480 to 3000 g/mol, preferably 1000 to 3000 g/mol.

Suitable dihydric polyether polyols are known per se to those skilled in the art. Polyetherols are prepared by known processes, for example by anionic polymerization with alkali metal hydroxides or alkali metal alkoxides as catalysts and with addition of at least one starter molecule comprising 2 to 8 reactive hydrogen atoms in bonded form, or through cationic polymerization with Lewis acids such as antimony pentachloride or boron fluoride etherate or through bases, for example potassium hydroxide, from one or more alkylene oxides having 2 to 4 carbon atoms in the alkylene radical. Suitable alkylene oxides are, for example, 1,3- and 1,2-propylene oxide, 1,2- and 2,3-butylene oxide, and ethylene oxide. In addition, tetrahydrofuran monomer may be used.

In an embodiment of the production process for the thermoplastic polyamide, the dihydric polyester diol or polyether diol, which comprises the diol composition in accordance with (ia), is selected from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 1500 g/mol.

In accordance with (ib), a dicarboxylic acid composition is used. The dicarboxylic acid composition comprises one or more dicarboxylic acids and/or one or more dicarboxylic acid derivatives. As the dicarboxylic acid, preference is given to organic dicarboxylic acids having 2 to 12 carbon atoms, further preferably aliphatic dicarboxylic acids having 4 to 6 carbon atoms. Examples of dicarboxylic acids that may be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used either individually or in admixture with one another. Instead of, or in addition to, the free dicarboxylic acids it is also possible to use the corresponding dicarboxylic acid derivatives, for example dicarboxylic anhydrides, which may likewise be used individually or in admixture with one another, and also mixtures comprising free dicarboxylic acids and dicarboxylic acid derivatives.

In an embodiment of the production process for the thermoplastic polyamide, the dicarboxylic acid composition in accordance with (ib) comprises at least one dicarboxylic acid or one dicarboxylic anhydride, with the dicarboxylic acid or dicarboxylic anhydride preferably selected from the group consisting of C2 to C12 dicarboxylic acids and the anhydrides thereof, further preferably from the group consisting of C4 to C8 dicarboxylic acids and the anhydrides thereof, further preferably at least 1,4-butanedioic acid (succinic acid) and succinic anhydride.

In an embodiment of the production process for the thermoplastic polyamide, the composition comprising a polymeric compound having two carboxylic acid moieties in accordance with (i) comprises at least one polyester dicarboxylic acid, polycarbonate dicarboxylic acid or polyether dicarboxylic acid, with the polyester, polycarbonate or polyether component preferably selected from the group of dihydric polyesters, polycarbonates, and polyethers, preferably from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 2000 g/mol. The polymeric compound having two carboxylic acid moieties comprises preferably at least HOOC—$(CH_2)_x$-O-PTHF—OOC—$(CH_2)_y$—COOH, where x and y are independently an integer in the range from 1 to 10, preferably in the range from 1 to 5, further preferably in the range 1 to 3, with the polymeric compound having two carboxylic acid moieties further preferably comprising at least HOOC—$(CH_2)_2$—COO-PTHF—OOC—$(CH_2)_2$—COOH.

In accordance with (ii), a dicarboxylic acid composition is likewise used, with the dicarboxylic acid composition comprising one or more dicarboxylic acids. As the dicarboxylic acid, preference is given to organic dicarboxylic acids having 2 to 12 carbon atoms, further preferably aliphatic dicarboxylic acids having 4 to 6 carbon atoms. Examples of dicarboxylic acids that may be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used either individually or in admixture with one another.

In an embodiment of the production process for the thermoplastic polyamide, the dicarboxylic acid composition in accordance with (ii) comprises at least one dicarboxylic acid, preferably selected from the group of C2 to C12 dicarboxylic acids, further preferably from the group of C4 to C8 dicarboxylic acids, further preferably at least 1,6-hexanedioic acid (adipic acid).

In accordance with (iii), a diisocyanate composition is used. The diisocyanate composition here comprises at least one diisocyanate. According to the invention, the diisocyanate composition may also comprise two or more diisocyanates. Diisocyanates that may be used are aliphatic, cycloaliphatic, araliphatic, and/or aromatic diisocyanates. Specific examples include the following aromatic isocyanates: 2,4-tolylene diisocyanate, mixtures of 2,4- and 2,6-tolylene diisocyanate (TDI), 4,4'-, 2,4'-, and/or 2,2'-diphenylmethane diisocyanate (MDI), mixtures of 2,4'- and 4,4'-diphenylmethane diisocyanate, urethane-, carbodiimide- or uretonimine-modified liquid 4,4'- and/or 2,4-diphenylmethane diisocyanate, 4,4'-diisocyanatodiphenylethane, mixtures of monomeric methylene diphenyl diisocyanates, and higher polycyclic homologs of methylene diphenyl diisocyanates (polymeric MDI), (1,2) and 1,5-naphthylene diisocyanate.

Aliphatic diisocyanates used are customary aliphatic and/or cycloaliphatic diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or 1-methyl-2,6-cyclohexane diisocyanate, 4,4'-, 2,4'- and/or 2,2'-dicyclohexylmethane diisocyanate.

In an embodiment of the production process for the thermoplastic polyamide, the diisocyanate composition in accordance with (iii) comprises at least one diisocyanate selected from the group consisting of 2,2'-diphenylmethane diisocyanate (2,2'-MDI), 2,4'-diphenylmethane diisocyanate (2,4'-MDI), 4,4'-diphenylmethane diisocyanate (4,4'-MDI), hexamethylene 1,6-diisocyanate (HDI), and 4,4'-, 2,4'-, and 2,2'-methylenedicyclohexyl diisocyanate (H12MDI), naphthylene diisocyanate NDI, tolylene diisocyanate (TDI), tolidine diisocyanate (TODI), para-diphenyl diisocyanate (PDI), preferably at least MDI.

In a preferred embodiment, aromatic diisocyanates are used. The use of an aromatic diisocyanate yields partially aromatic amide block copolymers with further-improved thermal stability.

The diisocyanate composition in accordance with (iii) may also be used in the form of a prepolymer, preferably a prepolymer having two free isocyanate groups, derived from at least one diisocyanate and at least one polyol, preferably a polyol having two terminal hydroxyl groups.

The use of a prepolymer allows the additional incorporation of urethane groups into the block copolymer in controllable proportions, through which it is possible, for example, to modify the properties of the polymer or increase its molecular weight.

Diisocyanate prepolymers are obtainable by reacting an excess of the above-described diisocyanates, for example at temperatures from 30 to 150° C., preferably at temperatures from 50 to 120° C., most preferably at approximately 80° C., with polyols to form the prepolymer. The preparation of the prepolymers according to the invention is preferably carried out using diisocyanates and commercially available polyols based on polyesters, derived for example from adipic acid, or polyethers, derived for example from ethylene oxide and/or propylene oxide, with the polyols preferably having two terminal OH groups.

Polyols are familiar to those skilled in the art and described for example in "Kunststoffhandbuch" [Plastics Handbook], volume 7, "Polyurethane" [Polyurethanes], Carl Hanser Verlag, 3rd edition, 1993, chapter 3.1. Particular preference is given to polyetherols as the polyols used.

Customary chain extenders or crosslinkers are optionally added to the named polyols during production of the isocyanate prepolymers. Such substances are known in principle from the prior art. The ratio of organic diisocyanates to polyols and optional chain extenders is preferably chosen such that the isocyanate prepolymer has an NCO content of 2% to 33.5%, preferably 10% to 32%, further preferably of 12% to 30%, and most preferably an NCO content of 15% to 28%.

In an embodiment, the diisocyanate composition in accordance with (iii) does not comprise a prepolymer, with preference given, in the production of the thermoplastic polyamide, to the use of no prepolymers in the reaction of (i), (ii), and (iii).

The production of the thermoplastic polyamide preferably uses no compound having free hydroxyl groups in the reaction of (i), (ii), and (iii); further preferably none of components (i), (ii), and (iii) contains free hydroxyl groups, further preferably none of components (i), (ii), and (iii) contains free hydroxyl groups and no further components having free hydroxyl groups are used.

An embodiment of the production process for the thermoplastic polyamide comprises the reaction of at least the components (i), (ii), and (iii):
(i) a diisocyanate composition comprising at least MDI;
(ii) a polyester dicarboxylic acid or polyether dicarboxylic acid composition comprising at least HOOC—$(CH_2)_x$COO-PTHF—OOC—$(CH_2)_y$—COOH, where x and y are independently an integer in the range from 1 to 10, preferably in the range from 1 to 5, further preferably in the range 1 to 3, further preferably at least HOOC—$(CH_2)_2$—COO-PTHF—OOC—$(CH_2)_2$—COOH;
(iii) a dicarboxylic acid composition comprising at least adipic acid.

The PTHF preferably has a number-average molecular weight Mn in the range from 500 to 3000 g/mol, further preferably in the range from 500 to 2000 g/mol.

The components (i), (ii), and (ii) are preferably used in a molar ratio of [(i)+(ii)]:(iii) in the range from 10:1 to 1:10, preferably in the range from 5:1 to 1:5, further preferably in the range from 2:1 to 1:2, further preferably in the range from 1.5:1 to 1:1.5, further preferably in the range from 1.2:1 to 1:1.2, further preferably in the range from 1.1:1 to 1:1.1, further preferably in the molar ratio [(i)+(ii)]:(iii) of 1:1. The molar ratio (i):(ii) is preferably in the range from 10:1 to 1:10, preferably in the range from 5:1 to 1:5, further preferably in the range from 2:1 to 1:2, further preferably in the range from 1.5:1 to 1:1.5, further preferably in the range from 1.2:1 to 1:1.2, further preferably in the range from 1.1:1 to 1:1.1, further preferably 1:1.

Preference is given to the use in the reaction of a catalyst having a Lewis base component, preferably a catalyst selected from the group consisting of N-methylimidazole, melamine, guanidine, cyanuric acid, dicyandiamide, and mixtures thereof, further preferably at least N-methylimidazole.

In an embodiment of the production process for the thermoplastic polyamide, components (i) and (ii) are brought into contact and then component (iii) is added.

In an embodiment of the production process for the thermoplastic polyamide, the reaction of the components (i), (ii), and (iii) takes place in a reactive extruder apparatus comprising at least two, preferably interconnected, extruders, preferably in a tandem reactive extruder.

In an embodiment of the production process for the thermoplastic polyamide, the carbon dioxide formed during the reaction is removed, resulting in an unfoamed polyamide, or the carbon dioxide formed during the reaction is used as a blowing agent for foaming, resulting in a foamed polyamide.

An embodiment of the production process for the thermoplastic polyamide comprises the reaction of at least the following components:
(i) a polyester dicarboxylic acid or polyether dicarboxylic acid composition comprising at least HOOC—$(CH_2)_x$COO-PTHF—OOC—$(CH_2)_y$—COOH, where x and y are independently an integer in the range from 1 to 10, preferably in the range from 1 to 5, further preferably in the range 1 to 3, further preferably at least HOOC—$(CH_2)_2$—COO-PTHF—OOC—$(CH_2)_2$—COOH;
(ii) a dicarboxylic acid composition comprising at least adipic acid;
(iii) a diisocyanate composition comprising at least MDI.

In a subsequent step the product may be extended or crosslinked with a polyisocyanate or polyepoxide, with use of a difunctional crosslinker preferred. If, for example, recycling can be avoided, use of a higher-functional crosslinker is also possible. In the case of polymers having terminal NCO groups, preference is given to using epoxides such as bisphenol A derivatives or aliphatic diepoxides and, in the case of terminal acid groups, to diisocyanates such as MDI.

The invention additionally relates to a thermoplastic polyamide obtained or obtainable by the process described above.

In addition, the invention relates to the use of a thermoplastic polyamide as described above or of a thermoplastic polyamide obtained or as described above for the production of a molded body, an injection-molded product, an extrusion product, a film, an extruded foam or a foam article.

In addition, the invention relates to the use of a thermoplastic polyamide as described above or of a thermoplastic polyamide obtainable or obtained by a process as described above for an article selected from the group of tubing, in particular pressure tubing, and cable sheathing.

In addition, the invention relates to the use of a foam article obtained or obtainable from a thermoplastic polyamide as described above or of a thermoplastic polyamide obtainable or obtained by a process as described above for an article selected from the group consisting of footwear soles; footwear sole components, in particular footwear midsoles; items of sports equipment, in particular balls; and damping elements, in particular damping elements for a machine or for an automobile.

In addition, the invention relates to a tandem reactive extruder, comprising 1) a first, zoned, temperature-controllable extruder (extruder 1), with extruder 1 including at least one extruder screw, a jacket covering the at least one extruder screw, and at least two zones comprising a first zone, a second zone downstream of the first zone, and an outlet in the second zone, and
2) a second, zoned, temperature-controllable extruder (extruder 2), with extruder 2 including at least one extruder screw, a jacket covering the at least one extruder screw, and at least three zones comprising a first zone, a second zone downstream of the first zone, a third zone downstream of the second zone, and an inlet in the third zone, and an extruder die head downstream of the third zone;
   with the inlet in the third zone of the second extruder 2 being connected to the outlet in the second zone of the first extruder 1.

The expression "first zone" additionally comprises structures in which there is at least one further additional zone upstream and/or downstream of the first zone, wherein "downstream of the first zone" at the same time means "upstream of the second zone". The same likewise applies to the respective second zone, i.e. the expression "second zone" additionally comprises structures in which there is at least one further additional zone upstream and/or downstream of the second zone, wherein "upstream of the second zone" at the same time means "downstream of the first zone" and "downstream of the second zone" at the same time means "upstream of the third zone". The same likewise applies to the third zone, i.e. the expression "third zone" additionally comprises structures in which there is at least one further additional zone upstream and/or downstream of the third zone.

In an embodiment of the tandem reactive extruder, the first extruder 1 comprises at least one further zone downstream of the first zone and upstream of the second zone.

The inlet in the third zone of the second extruder 2 is connected to the outlet in the second zone of the first extruder 1. In an embodiment of the tandem reactive extruder, the connection linking the inlet in the third zone of the second extruder 2 and the outlet in the second zone of the first extruder 1 is designed to allow material to pass from the first zone into the third zone of the second extruder.

In an embodiment of the tandem reactive extruder, the first extruder comprises inlet orifices in the first and second zones.

In an embodiment of the tandem reactive extruder, the second extruder comprises inlet orifices in at least the first and second zones.

Further zones optionally present upstream or downstream optionally have inlet orifices and/or outlet orifices through which materials may be added or removed.

It is preferable if at least the respective first and second zones are temperature-controllable, likewise the third zone, and it is further preferable if the respective first and second zones and the third zone are temperature-controllable, likewise any further zones optionally present upstream or downstream.

The present invention is illustrated in more detail by the following embodiments and combinations of embodiments, which are apparent from the corresponding dependency references and other references. In particular, it should be noted that in every case where a range of embodiments is mentioned, for example in the context of an expression such as "the process according to any of embodiments 1 to 4", each embodiment in this range is deemed to be explicitly disclosed to those skilled in the art, i.e. the wording of this expression is to be understood by those skilled in the art as synonymous with "the process according to any of embodiments 1, 2, 3, and 4".

1. A thermoplastic polyamide obtainable or obtained through the reaction of at least the components (i), (ii), and (iii):
   (i) a composition comprising a polymeric compound having two carboxylic acid moieties;
   (ii) a dicarboxylic acid composition comprising at least one dicarboxylic acid;
   (iii) a diisocyanate composition comprising at least one diisocyanate.
2. The thermoplastic polyamide according to embodiment 1, wherein the composition in accordance with (i) comprises 95% by weight, preferably 99% by weight, of one or more polymeric compounds each having two carboxylic acid moieties, based on the total weight of the composition in accordance with (i).
3. The thermoplastic polyamide according to embodiment 1 or 2, wherein the dicarboxylic acid composition in accordance with (ii) comprises 95% by weight, preferably 99% by weight, of one or more dicarboxylic acids and/or dicarboxylic anhydrides, based on the total weight of the dicarboxylic acid composition in accordance with (ii).
4. The thermoplastic polyamide according to any of embodiments 1 to 3, wherein the diisocyanate composition in accordance with (iii) comprises 95% by weight, preferably 99% by weight, of one or more diisocyanates, based on the total weight of the diisocyanate composition in accordance with (iii).
5. The thermoplastic polyamide according to any of embodiments 1 to 4, wherein the composition comprising a polymeric compound having two carboxylic acid moieties in accordance with (i) comprises at least one polyester dicarboxylic acid, polycarbonate dicarboxylic acid or polyether dicarboxylic acid, with the polyester, polycarbonate or polyether component preferably selected from the group of dihydric polyesters, polycarbonates, and polyethers, preferably from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, preferably in the range from 500 to 2000 g/mol, wherein the polymeric compound having two carboxylic acid moieties comprises preferably at least HOOC—$(CH_2)_x$COO-PTHF—

OOC—(CH$_2$)$_y$—COOH, where x and y are independently an integer in the range from 1 to 10, preferably in the range from 1 to 5, further preferably in the range 1 to 3, with the polymeric compound having two carboxylic acid moieties further preferably comprising at least HOOC—(CH$_2$)$_2$—COO-PTHF—OOC—(CH$_2$)$_2$—COOH.

6. The thermoplastic polyamide according to any of embodiments 1 to 5, wherein the composition comprising a polymeric compound having two carboxylic acid moieties in accordance with (i) is obtained or obtainable through the reaction of the components (ia) and (ib):
   (ia) a diol composition, comprising a dihydric polyester diol or polyether diol, is preferably selected from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 1500 g/mol; and
   (ib) a dicarboxylic acid composition;
   resulting in a polymeric compound having two carboxylic acid moieties, which preferably has no free hydroxyl groups.

7. The thermoplastic polyamide according to embodiment 6, wherein the dicarboxylic acid composition in accordance with (ib) comprises at least one dicarboxylic acid or one dicarboxylic anhydride, with the dicarboxylic acid or dicarboxylic anhydride preferably selected from the group consisting of C2 to C12 dicarboxylic acids and the anhydrides thereof, further preferably from the group consisting of C4 to C8 dicarboxylic acids and the anhydrides thereof, further preferably at least 1,4-butanedioic acid (succinic acid) and succinic anhydride, 8. The thermoplastic polyamide according to any of embodiments 1 to 7, wherein the dicarboxylic acid composition in accordance with (ii) comprises at least one dicarboxylic acid, preferably selected from the group of C2 to C12 dicarboxylic acids, further preferably from the group of C4 to C8 dicarboxylic acids, further preferably at least 1,6-hexanedioic acid (adipic acid).

9. The thermoplastic polyamide according to any of embodiments 1 to 8, wherein the diisocyanate composition in accordance with (iii) comprises at least one diisocyanate selected from the group consisting of 2,2'-diphenylmethane diisocyanate (2,2'-MDI), 2,4'-diphenylmethane diisocyanate (2,4'-MDI), 4,4'-diphenylmethane diisocyanate (4,4'-MDI), hexamethylene 1,6-diisocyanate (HDI), and 4,4'-, 2,4'-, and 2,2'-methylenedicyclohexyl diisocyanate (H12MDI), naphthylene diisocyanate NDI, tolylene diisocyanate (TDI), tolidine diisocyanate (TODI), para-diphenyl diisocyanate (PDI), preferably at least MDI.

10. The thermoplastic polyamide according to any of embodiments 1 to 9, wherein no compound having free hydroxyl groups is used in the reaction of (i), (ii), and (iii); preferably none of components (i), (ii), and (iii) contains free hydroxyl groups, further preferably none of components (i), (ii), and (iii) contains free hydroxyl groups and no further components having free hydroxyl groups are used.

11. The thermoplastic polyamide according to any of embodiments 1 to 6, wherein the diisocyanate composition in accordance with (iii) comprises at least one prepolymer, preferably at least one prepolymer having free isocyanate groups, derived from at least one diisocyanate and at least one polyol.

12. The thermoplastic polyamide according to any of embodiments 1 to 11, preferably obtainable or obtained according to any of embodiments 1 to 10 through the reaction of at least the components (i), (ii), and (iii):
   (i) a diisocyanate composition comprising at least MDI;
   (ii) a polyester dicarboxylic acid or polyether dicarboxylic acid composition comprising at least HOOC—(CH$_2$)$_x$COO-PTHF—OOC—(CH$_2$)$_y$—COOH, where x and y are independently an integer in the range from 1 to 10, preferably in the range from 1 to 5, further preferably in the range 1 to 3, further preferably at least HOOC—(CH$_2$)$_2$—COO-PTHF—OOC—(CH$_2$)$_2$—COOH;
   (iii) a dicarboxylic acid composition comprising at least adipic acid.

13. The thermoplastic polyamide according to any of embodiments 1 to 12, wherein the reaction uses a catalyst having a Lewis base component, preferably a catalyst selected from the group consisting of N-methylimidazole, melamine, guanidine, cyanuric acid, dicyandiamide, and mixtures thereof, further preferably at least N-methylimidazole.

14. A process for producing a thermoplastic polyamide, in particular a thermoplastic polyamide, comprising the reaction of at least the following components:
   (i) a composition comprising a polymeric compound having two carboxylic acid moieties;
   (ii) a dicarboxylic acid composition;
   (iii) a diisocyanate composition.

15. The process according to embodiment 14, wherein the composition in accordance with (i) comprises 95% by weight, further preferably 99% by weight of one or more polymeric compounds each having two carboxylic acid moieties, based on the total weight of the composition in accordance with (i).

16. The process according to embodiment 14 or 15, wherein the dicarboxylic acid composition in accordance with (ii) comprises 95% by weight, further preferably 99% by weight of one or more dicarboxylic acids and/or dicarboxylic anhydrides, based on the total weight of the dicarboxylic acid composition in accordance with (ii).

17. The process according to any of embodiments 14 to 16, wherein the diisocyanate composition in accordance with (iii) comprises 95% by weight, further preferably 99% by weight, of one or more diisocyanates, based on the total weight of the diisocyanate composition in accordance with (iii).

18. The process according to any of embodiments 14 to 17, wherein the composition comprising a polymeric compound having two carboxylic acid moieties in accordance with (i) comprises at least one polyester dicarboxylic acid, polycarbonate dicarboxylic acid or polyether dicarboxylic acid, with the polyester, polycarbonate or polyether component preferably selected from the group of dihydric polyesters, polycarbonates, and polyethers, preferably from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 2000 g/mol, wherein the polymeric compound having two carboxylic acid moieties comprises preferably at least HOOC—$(CH_2)_x$COO-PTHF—OOC—$(CH_2)_y$—COOH, where x and y are independently an integer in the range from 1 to 10, preferably in the range from 1 to 5, further preferably in the range 1 to 3, with the polymeric compound having two carboxylic acid moieties preferably comprising at least HOOC—$(CH_2)_2$—COO-PTHF—OOC—$(CH_2)_2$—COOH.

19. The process according to any of embodiments 14 to 18, wherein the composition comprising a polymeric compound having two carboxylic acid moieties in accordance with (i) is obtained or obtainable through the reaction of the components (ia) and (ib):
   (ia) a diol composition, comprising a dihydric polyester diol or polyether diol, is preferably selected from the group consisting of polyethylene glycol, polypropylene glycol, polyadipates, polycarbonates/polycarbonate diols, and polycaprolactones and polytetrahydrofuran (PTHF), preferably PTHF, with the PTHF preferably having a number-average molecular weight Mn in the range from 500 to 3000 g/mol, further preferably in the range from 500 to 1500 g/mol; and
   (ib) a dicarboxylic acid composition;
   resulting in a polymeric compound having two carboxylic acid moieties, which preferably has no free hydroxyl groups.

20. The process according to embodiment 19, wherein the dicarboxylic acid composition in accordance with (ib) comprises at least one dicarboxylic acid or one dicarboxylic anhydride, with the dicarboxylic acid or dicarboxylic anhydride preferably selected from the group consisting of C2 to C12 dicarboxylic acids and the anhydrides thereof, further preferably from the group consisting of C4 to C8 dicarboxylic acids and the anhydrides thereof, further preferably at least 1,4-butanedioic acid (succinic acid) and succinic anhydride, 21. The process according to any of embodiments 14 to 20, wherein the dicarboxylic acid composition in accordance with (ii) comprises at least one dicarboxylic acid, preferably selected from the group of C2 to C12 dicarboxylic acids, further preferably from the group of C4 to C8 dicarboxylic acids, further preferably at least 1,6-hexanedioic acid (adipic acid).

22. The process according to any of embodiments 14 to 22, wherein the diisocyanate composition in accordance with (iii) comprises at least one diisocyanate selected from the group consisting of 2,2'-diphenylmethane diisocyanate (2,2'-MDI), 2,4'-diphenylmethane diisocyanate (2,4'-MDI), 4,4'-diphenylmethane diisocyanate (4,4'-MDI), hexamethylene 1,6-diisocyanate (HDI), and 4,4'-, 2,4'-, and 2,2'-methylenedicyclohexyl diisocyanate (H12MDI), naphthylene diisocyanate NDI, tolylene diisocyanate (TDI), tolidine diisocyanate (TODI), para-diphenyl diisocyanate (PDI), preferably at least MDI.

23. The process according to any of embodiments 14 to 22, wherein no compound having free hydroxyl groups is used in the reaction of (i), (ii), and (iii); preferably none of components (i). (ii), and (iii) contains free hydroxyl groups, further preferably none of components (i), (ii), and (iii) contains free hydroxyl groups and no further components having free hydroxyl groups are used.

24. The process according to any of embodiments 14 to 23, wherein the diisocyanate composition in accordance with (iii) comprises at least one prepolymer, preferably at least one prepolymer having free isocyanate groups, derived from at least one diisocyanate and at least one polyol.

25. The process according to any of embodiments 14 to 24, preferably according to any of embodiments 14 to 23, comprising the reaction of at least the components (i), (ii), and (iii):
   (i) a diisocyanate composition comprising at least MDI;
   (ii) a polyester dicarboxylic acid or polyether dicarboxylic acid composition comprising at least HOOC—$(CH_2)_x$COO-PTHF—OOC—$(CH_2)_y$—COOH, where x and y are independently an integer in the range from 1 to 10, preferably in the range from 1 to 5, further preferably in the range 1 to 3, further preferably at least HOOC—$(CH_2)_2$—COO-PTHF—OOC—$(CH_2)_y$—COOH;
   (iii) a dicarboxylic acid composition comprising at least adipic acid.

26. The process according to embodiments 14 to 25, wherein the reaction uses a catalyst having a Lewis base component, preferably a catalyst selected from the group consisting of N-methylimidazole, melamine, guanidine, cyanuric acid, dicyandiamide, and mixtures thereof, further preferably at least N-methylimidazole.

27. The process according to any of embodiments 14 to 26, wherein components (i) and (ii) are brought into contact and then component (iii) is added.

28. The process according to any of embodiments 14 to 27, wherein the reaction of the components (i), (ii), and (iii) takes place in a reactive extruder apparatus comprising at least two, preferably interconnected, extruders, further preferably in a tandem reactive extruder.

29. The process according to any of embodiments 14 to 28, wherein the carbon dioxide formed during the reaction is removed, resulting in an unfoamed polyamide, or the carbon dioxide formed during the reaction is used as a blowing agent for foaming, resulting in a foamed polyamide.

30. The process according to any of embodiments 14 to 29, comprising the reaction of at least the following components:
   (i) a polyester dicarboxylic acid or polyether dicarboxylic acid composition comprising at least HOOC—$(CH_2)_x$COO-PTHF—OOC—$(CH_2)_y$—COOH, where x and y are independently an integer in the range from 1 to 10, preferably in the range from 1 to 5, further preferably in the range 1 to 3, further preferably at least HOOC—$(CH_2)_2$—COO-PTHF—OOC—$(CH_2)_y$—COOH;
   (ii) a dicarboxylic acid composition comprising at least adipic acid;
   (iii) a diisocyanate composition comprising at least MDI.

31. A thermoplastic polyamide obtained or obtainable by the process according to any of embodiments 14 to 30.

32. The use of a thermoplastic polyamide according to any of embodiments 1 to 13 or of a thermoplastic polyamide obtained or obtainable by the process according to any of embodiments 14 to 30 for the production of a molded body, an injection-molded product, an extrusion product, a film, an extruded foam or a foam article, 33. The use of a thermoplastic polyamide according to any of embodiments 1 to 13 or of a thermoplastic polyamide obtainable or obtained by a process according to any of embodiments 14 to 30 for an article selected from the group of tubing, in particular pressure tubing, and cable sheathing.

34. The use of a foam article obtained or obtainable from a thermoplastic polyamide according to any of embodiments 1 to 13 or of a thermoplastic polyamide obtainable or obtained by a process according to any of embodiments 24 to 30 for an article selected from the group consisting of footwear soles; footwear sole components, in particular footwear midsoles; items of sports equipment, in particular balls; and damping elements, in particular damping elements for a machine or for an automobile.

35. A tandem reactive extruder, comprising
   1) a first, zoned, temperature-controllable extruder (extruder 1), with extruder 1 including at least one extruder screw, a jacket covering the at least one extruder screw, and at least two zones comprising a first zone, a second zone downstream of the first zone, and an outlet in the second zone, and
   2) a second, zoned, temperature-controllable extruder (extruder 2), with extruder 2 including at least one extruder screw, a jacket covering the at least one extruder screw, and at least three zones comprising a first zone, a second zone downstream of the first zone, a third zone downstream of the second zone, and an inlet in the third zone, and an extruder die head downstream of the third zone;
   with the inlet in the third zone of the second extruder 2 being connected to the outlet in the second zone of the first extruder 1.

36. The tandem reactive extruder according to embodiment 35, wherein the first extruder comprises inlet orifices in the first and second zones.

37. The tandem reactive extruder according to embodiment 35 or 36, wherein the second extruder comprises inlet orifices in at least the first and second zones.

38. The tandem reactive extruder according to any of embodiments 35 to 27, wherein the connection linking the inlet in the third zone of the second extruder 2 and the outlet in the second zone of the first extruder 1 is designed to allow material to pass from the first zone into the third zone of the second extruder.

39. The tandem reactive extruder according to any of embodiments 35 to 27, wherein the first extruder 1 comprises at least one further zone downstream of the first zone and upstream of the second zone.

The examples shown below are provided to illustrate the invention but are in no way intended to restrict the subject matter of the present invention.

EXAMPLES

1. Chemicals

| Name | Chemical name |
|---|---|
| Polyisocyanate | 4,4'-Diphenylmethane diisocyanate (4,4'-MDI) |
| Polycarbonic acid | Adipic acid |
| Antifoam | Silicone antifoam (100% silicone antifoam from Momentive) |

-continued

| Name | Chemical name |
|---|---|
| Catalyst | N-Methylimidazole |
| Acid anhydride | Succinic anhydride |
| Polyol | Polytetramethylene ether glycol (PTHF) having an OH number in the range from 109.5 to 115.1 mg KOH/g |

2. Tandem Reactive Extruder

Reactive extruder having a tandem assembly of two extruders, with each extruder having a multiplicity of separate, temperature-controllable zones (tandem reactive extruder). The tandem reactive extruder comprises a first, zoned, temperature-controllable extruder (extruder 1) that includes an extruder screw, a jacket covering the at least one extruder screw, and at least two zones comprising a first zone, a second zone downstream of the first zone, and an outlet in the second zone; and a second, zoned, temperature-controllable extruder (extruder 2), with extruder 2 including an extruder screw, a jacket covering the one extruder screw, and at least three zones comprising a first zone, a second zone downstream of the first zone, a third zone downstream of the second zone, and an inlet in the third zone; and an extruder die head downstream of the third zone, with the inlet in the third zone of the second extruder 2 being connected to the outlet in the second zone of the first extruder 1. The first extruder has inlet orifices in the first and second zones through which materials are (able to be) added. The second extruder likewise has inlet orifices in at least the first and second zones through which materials are (able to be) added. The connection linking the inlet in the third zone of the second extruder 2 and the outlet in the second zone of the first extruder 1 allows the substance (mixture) obtained in the second zone of the first extruder 1 to pass into the third zone of the second extruder 2, where it comes into contact with the substance (mixture) from the second extruder 2 obtained in the second and/or third zone and is preferably mixed there. A schematic representation of a tandem reactive extruder assembly is shown in the FIGURE.

3. Examples 3.1 Synthesis of the Polymeric Compound Having Two Carboxylic Acid Moieties A polymeric compound having two carboxylic acid moieties, in this case HOOC—$(CH_2)_2$—COO-PTHF—OOC—$(CH_2)_2$—COOH, was prepared by reacting the polyol with succinic anhydride. For this, a 20-liter reactor fitted with a reflux condenser was charged under a nitrogen atmosphere with 8 kg of polytetrahydrofuran having a molecular weight Mw of 1000 g/mol and heated to 130° C. with stirring. A twice-molar amount (1602 g) of solid succinic anhydride (Mw 100.07 g/mol) was added to the reactor. The succinic anhydride melted in the PTHF, after which the reactor contents were heated to 200° C. and held at this temperature, with stirring, for at least 1 hour. The succinic anhydride reacted with the free OH groups of the PTHF with ring opening and the formation of ester bonds. The cooled reaction mixture was then transferred to a metal drum.

3.2 Synthesis of Thermoplastic Polyamide

The samples were prepared using two extruders in a tandem assembly (tandem reactive extruder) as follows: The adipic acid was added in the first extruder 1 in the first zone (in this case: zone 1, region of heating element 1 of extruder 1), melted, and mixed with the HOOC—$(CH_2)_2$—COO-PTHFOOC—$(CH_2)_2$—COOH from 3.1 in a second zone (in this case: zone 3 of the first extruder for sample 1 and sample 3, addition of the HOOC—(CH$_2$)$_2$—COO-PTHFOOC—(CH$_2$)$_y$—COOH in the region of heating element 5 of extruder 1). Antifoam and catalyst were added in the first zone (zone 1) of the second extruder (in the region of heating element 1 of extruder 2) and, for sample 1 and sample 3, the MDI was added in the second zone (in this case: zone 2) of the second extruder (region of heating element 2 of extruder 2). For sample 7, the MDI had already been added in the first zone (in this case: zone 1) of the first extruder; the formulation was analogous to sample 3. The throughput was ~10 kg/h throughout and the extruder speed of the two extruders was 200 rpm. The formulations in each case are shown in Table 1.

TABLE 1

| Formulations for samples 1, 2, 3, and 7 | | | | |
|---|---|---|---|---|
| Material | 1 | 2 | 3 | 7 |
| Polycarboxylic acid | 0.737 kg/h | 0.737 kg/h | 0.737 kg/h | 0.737 kg/h |
| HOOC—(CH$_2$)$_2$—COO—PTHFOOC—(CH$_2$)$_2$—COOH | 6.567 kg/h | 6.567 kg/h | 6.567 kg/h | 6.567 kg/h |
| Polyisocyanate | 2.617 kg/h | 2.50 kg/h | 2.617 kg/h | 2.617 kg/h |
| Catalyst | 0.05 kg/h | 0.05 kg/h | 0.10 kg/h | 0.10 kg/h |
| Antifoam | 0.02 kg/h | 0.02 kg/h | 0.02 kg/h | 0.02 kg/h |

The temperature profile of the first and second extruder (extruder 1, extruder 2) is shown in Table 2.

TABLE 2

| | | Temperature [° C.] | | | | | | |
|---|---|---|---|---|---|---|---|---|
| Sample | Extruder | Heating element 1 | Heating element 2 | Heating element 3 | Heating element 4 | Heating element 5 | Heating element 6 | Heating element 7 |
| 1 | 1 | 30 | 100 | 100 | 100 | 220 | 240 | 240 |
|   | 2 | 25 | 120 | 160 | 180 | 180 | 180 | 220 |
| 2 | 1 | 30 | 100 | 100 | 100 | 220 | 240 | 240 |
|   | 2 | 30 | 120 | 160 | 180 | 180 | 180 | 220 |
| 3 | 1 | 30 | 100 | 100 | 100 | 220 | 240 | 240 |
|   | 2 | 30 | 120 | 160 | 180 | 180 | 180 | 220 |
| 7 | 1 | 30 | 100 | 100 | 100 | 220 | 240 | 240 |
|   | 2 | 25 | 120 | 160 | 160 | 180 | 220 | 220 |

| | | Temperature [° C.] | | | | | | |
|---|---|---|---|---|---|---|---|---|
| Sample | Extruder | Heating element 8 | Heating element 9 | Heating element 10 | Heating element 11 | Heating element 12 | Heating element 13 | Heating element 14 |
| 1 | 1 | 240 | 240 | 240 | 240 | | | |
|   | 2 | 220 | 220 | 220 | 220 | 220 | 220 | 220 |
| 2 | 1 | 240 | 240 | 240 | 240 | | | |
|   | 2 | 220 | 220 | 220 | 220 | 220 | 220 | 220 |
| 3 | 1 | 240 | 240 | 240 | 240 | | | |
|   | 2 | 220 | 220 | 220 | 220 | 220 | 220 | 220 |
| 7 | 1 | 240 | 240 | 240 | 240 | | | |
|   | 2 | 220 | 220 | 220 | 220 | 220 | 220 | 220 |

The samples were investigated by GPC and IR spectroscopy. The GPC data show that adequate molecular weights were achieved and that polymers had consequently been obtained. Table 3 shows the molecular weights for samples 1, 2, 3, and 7. The IR spectra show the clear presence of amide structures for all four samples.

TABLE 3

| Weight-average molecular weight | |
|---|---|
| Sample | Mw [g/mol] |
| 1 | 12 700 |
| 2 | 16 300 |
| 3 | 9370 |
| 7 | 38 100 |

DESCRIPTION OF THE FIGURE

The FIGURE shows a reactive extruder having a tandem assembly of two extruders, with each extruder having a multiplicity of separate, temperature-controllable heating elements (tandem reactive extruder). The tandem reactive extruder comprises a first, zoned, temperature-controllable extruder (extruder 1) that includes the at least one extruder screw (not shown), a jacket covering the at least one extruder screw, and at least two zones comprising a first zone (1-1), a second zone downstream of the first zone (1-2), and an outlet in the second zone; and a second, zoned, temperature-controllable extruder (extruder 2), with extruder 2 including an extruder screw (not shown), a jacket covering the one extruder screw, and at least three zones comprising a first zone (2-1), a second zone downstream of the first zone (2-2), a third zone downstream of the second zone (2-3), and an inlet in the third zone; and an extruder die head downstream of the third zone (2-E), with the inlet in the third zone of the second extruder 2 being connected to the outlet in the second zone of the first extruder 1 (D). The first extruder has inlet orifices in the first and second zones through which materials are (able to be) added. The second extruder likewise has inlet orifices in at least the first and second zones through which materials are (able to be) added. The connection linking the inlet in the third zone of the second extruder 2 and the outlet in the second zone of the first extruder 1 (1-2) allows the substance (mixture) obtained in the second zone of the first extruder 1 to pass into the third zone of the second extruder 2 (2-3), where it comes into contact with the substance (mixture) from the second extruder 2 obtained in the second and/or third zone and is preferably mixed there. Additionally shown for the first extruder 1 is a further zone (X) downstream of the first zone and upstream of the second zone, with the first zone (1-1) and zone (X) representing a melting zone (1-A). The further part of extruder 1 leading from (1-2) is the initial mixing zone (1-B). In the second extruder a mixing zone (2-B) is shown; also shown is a reaction zone (2-C) leading from the inlet/leading from the connection between the outlet from the first extruder and the inlet of the second extruder (D). Discharge, i.e. extrusion, of the resulting thermoplastic polyamide takes place via the extruder die head (2-E) of the second extruder 2.

CITED LITERATURE

EP 2 700 669 A1
"Kunststoffhandbuch" [Plastics Handbook], volume 7, "Polyurethane" [Polyurethanes], Carl Hanser Verlag, 3rd edition, 1993, chapter 3.1

The invention claimed is:
1. A process for producing a thermoplastic polyamide, the process comprising:
reacting at least the following components:
(i) a composition comprising a polymeric compound having two carboxylic acid moieties;
(ii) a dicarboxylic acid composition; and
(iii) a diisocyanate composition,
wherein a catalyst having a Lewis base component is used in the reaction, wherein the catalyst is selected from the group consisting of N-methylimidazole, melamine, guanidine, cyanuric acid, dicyandiamide, and mixtures thereof,
wherein the polymeric compound having two carboxylic acid moieties comprises at least HOOC—$(CH_2)_x$COO-PTHF—OOC—$(CH_2)_y$—COOH,
wherein PTHF is polytetrahydrofuran, and
wherein x and y are independently an integer in the range from 1 to 10,
wherein the reaction of the components (i), (ii), and (iii) takes place in a reactive extruder apparatus comprising at least two extruders.
2. The process according to claim 1, wherein the polytetrahydrofuran (PTHF) has a number-average molecular weight Mn in the range from 500 to 3000 g/mol.
3. The process according to claim 2, wherein the polymeric compound having two carboxylic acid moieties comprises at least HOOC—$(CH_2)_x$COO-PTHF—OOC—$(CH_2)_y$—COOH,
wherein x and y are independently an integer in the range from 1 to 5.
4. The process according to claim 2, wherein the polymeric compound having two carboxylic acid moieties comprises at least HOOC—$(CH_2)_2$COO-PTHF—OOC—$(CH_2)_2$—COOH.
5. The process according to claim 1, wherein the diisocyanate composition comprises at least one diisocyanate selected from the group consisting of 2,2'-diphenylmethane diisocyanate (2,2'-MDI), 2,4'-diphenylmethane diisocyanate (2,4'-MDI), 4,4'-diphenylmethane diisocyanate (4,4'-MDI), hexamethylene 1,6-diisocyanate (HDI), 4,4'-, 2,4'-, and 2,2'-methylenedicyclohexyl diisocyanate (H12MDI), naphthylene diisocyanate NDI, tolylene diisocyanate (TDI), tolidine diisocyanate (TODI), and para-diphenyl diisocyanate (PDI).
6. The process according to claim 1, wherein the thermoplastic polyamide is obtainable through the reaction of at least the components (i), (ii), and (iii):
(i) a diisocyanate composition comprising at least MDI;
(ii) a polyester dicarboxylic acid or polyether dicarboxylic acid composition comprising at least HOOC—$(CH_2)_x$COO-PTHF—OOC—$(CH_2)_y$—COOH,
wherein x and y are independently an integer in the range from 1 to 10, and
(iii) a dicarboxylic acid composition comprising at least adipic acid.
7. The process according to claim 6, wherein the polyester dicarboxylic acid or polyether dicarboxylic acid composition comprises at least HOOC—$(CH_2)_2$—COO-PTHF—OOC—$(CH_2)_2$—COOH.
8. The process according to claim 1, wherein the PTHF has a number-average molecular weight Mn in the range from 500 to 3000 g/mol;
and/or
wherein the dicarboxylic acid composition comprises at least one dicarboxylic acid;
and/or
wherein the diisocyanate composition comprises at least one diisocyanate selected from the group consisting of 2,2'-diphenylmethane diisocyanate (2,2'-MDI), 2,4'-diphenylmethane diisocyanate (2,4'-MDI), 4,4'-diphenylmethane diisocyanate (4,4'-MDI), hexamethylene 1,6-diisocyanate (HDI), 4,4'-, 2,4'-, and 2,2'-methylenedicyclohexyl diisocyanate (H12MDI), naphthylene diisocyanate NDI, tolylene diisocyanate (TDI), tolidine diisocyanate (TODI), and para-diphenyl diisocyanate (PDI).
9. The process according to claim 1, wherein no compound having free hydroxyl groups is used in the reaction of the components (i), (ii), and (iii).
10. The process according to claim 1, wherein the dicarboxylic acid composition comprises a dicarboxylic acid selected from the group consisting of $C_2$ to $C_{12}$ dicarboxylic acids.
11. The process according to claim 1, wherein the dicarboxylic acid composition comprises 1,6-hexanedioic acid.
12. The process according to claim 1, wherein the components (i), (ii), and (iii) do not contain free hydroxyl groups.
13. The process according to claim 1, wherein the components (i), (ii), and (iii) do not contain free hydroxyl groups and no further components having free hydroxyl groups are used.

14. The process according to claim 1, wherein the reaction of the components (i), (ii), and (iii) takes place in a tandem reactive extruder.

15. The process according to claim 1, wherein a molded body, an injection-molded product, an extrusion product, an extruded foam, or a foam article is produced, using at least the two extruders.

\* \* \* \* \*